United States Patent
Ogo et al.

(10) Patent No.: US 8,038,101 B2
(45) Date of Patent: Oct. 18, 2011

(54) ATTITUDE CHANGE CONTROL METHOD, ATTITUDE CHANGE CONTROL SYSTEM, ATTITUDE CHANGE CONTROL PROGRAM AND PROGRAM RECORDING MEDIUM

(75) Inventors: Keita Ogo, Tokyo (JP); Toshio Kamiya, Tokyo (JP); Ken Maeda, Tokyo (JP)

(73) Assignee: NEC TOSHIBA Space Systems, Ltd., Tokyo (JP)

( * ) Notice: Subject to any disclaimer, the term of this patent is extended or adjusted under 35 U.S.C. 154(b) by 578 days.

(21) Appl. No.: 12/027,769

(22) Filed: Feb. 7, 2008

(65) Prior Publication Data
US 2008/0203230 A1    Aug. 28, 2008

(30) Foreign Application Priority Data

Feb. 7, 2007   (JP) ................... 2007-027853

(51) Int. Cl.
*B64G 1/28* (2006.01)
(52) U.S. Cl. .................................... 244/165
(58) Field of Classification Search ............ 244/164, 244/165
See application file for complete search history.

(56) References Cited

U.S. PATENT DOCUMENTS

| | | | | |
|---|---|---|---|---|
| 4,599,697 A | * | 7/1986 | Chan et al. | 701/13 |
| 5,692,707 A | * | 12/1997 | Smay | 244/165 |
| 6,305,647 B1 | * | 10/2001 | Defendini et al. | 244/165 |
| 7,185,855 B2 | * | 3/2007 | Peck | 244/165 |

FOREIGN PATENT DOCUMENTS

| | | | |
|---|---|---|---|
| JP | 2637287 B | | 4/1997 |
| JP | 2000142594 A | | 5/2000 |
| JP | 2001063699 A | | 3/2001 |
| JP | 2001-056617 | * | 3/2002 |
| JP | 2002-255450 | * | 8/2002 |
| JP | 2002255098 A | | 9/2002 |
| JP | 2004090796 A | | 3/2004 |
| JP | 2006008132 A | | 1/2006 |

OTHER PUBLICATIONS

Japanese Office Action for JP2007-027853 issued Apr. 10, 2009.
Tsuneo Yoshikawa, "A Steering Law for Three Double-Gimbal Control Moment Gyro Systems", NASA TM-X-64926, Mar. 1975, George. C. Marshall Space Flight Center, Alabama.
Yoshihiko Nakamura et al., "Inverse Kinematic Solutions with Singularity Robustness for Robot Manipulator Control", Journal of Dynamic Systems, Measurement and Control, Sep. 1986, pp. 163-171, vol. 108.

(Continued)

*Primary Examiner* — Tien Dinh
*Assistant Examiner* — Keith L Dixon (57) ABSTRACT

Disclosed is an attitude change control system that is designed to efficiently output a torque for attitude change of a space craft using CMGs and realizes a real time CMG driving rule. A CMG gimbal steering law 15 generates target profiles for setting angle and angular velocity for each gimbal by applying an anisotropic weighted gradient method based upon the necessary torque calculated by a feed back controller 13 and a feed forward controller 14 from the angle and angular velocity in the target direction from the attitude navigator 12 and the current angle and angular velocity of the space craft estimated by the attitude estimator 11 as well as the current condition of each gimbal from the CMG 40, thereby controlling the CMG 40 for changing the attitude of the space craft dynamics 50 to the target direction.

10 Claims, 8 Drawing Sheets

OTHER PUBLICATIONS

Bong Wie et al., "Singularity Robust Steering Logic for Redundant Single-Gimbal Control Moment Gyros", Journal of Guidance, Control and Dynamics, Sep.-Oct. 2001, pp. 865-872, vol. 24, No. 5.

Haruhisa Kurokawa, "Constrained Steering Law of Pyramid-Type Control Moment Gyros and Ground Tests", Journal of Guidance, Control and Dynamics, May-Jun. 1997, pp. 445-449, vol. 20, No. 3.

Joseph A. Paradiso, Application of a Directed Search to Global Steering of Single Gimballed CMGs, CSDL-P-3014, AIAA Paper 91-271-CP, Proc. of the AIAA Guidance, Navigation and Control Conference, New Orleans, LA, Aug. 1991, pp. 1023-1035.

Japanese Office Action for JP2007-027853 issued Jul. 17, 2009.

* cited by examiner

X-Y-Z :Coordinate system for body
X'-Y'-Z' :Coordinate system for input output gain eigen vector

Theory of anisotropic weighted gradient method

FIG. 6

Attitude change profile

ATTITUDE CHANGE CONTROL METHOD, ATTITUDE CHANGE CONTROL SYSTEM, ATTITUDE CHANGE CONTROL PROGRAM AND PROGRAM RECORDING MEDIUM

INCORPORATION BY REFERENCE

This application is based upon and claims the benefit of priority from Japanese patent application no. 2007-027853, filed on Feb. 7, 2007, the disclosure of which is incorporated herein in its entirety by reference.

FIELD OF THE INVENTION

The present invention relates to an attitude change control method, an attitude change control system, an attitude change control program and a program recording medium.

BACKGROUND OF THE INVENTION

In connection with driving rules in a CMG (Control Moment Gyro) system having redundancy, there are a large number of reports or technical papers directed to the ways of avoiding or getting rid of a singularity. Qualitatively, a driving rule for maintaining the input output gain always high is described in Yoshikawa, T., "A Steering Law for Three Double Gimbals Control Moment Gyro System", NASA TM-X-64926 (1975) (Non-patent Document 1).

As described in the Non-patent Document 1, the "Gradient Method" (referred to as the GM method below) is a gimbal driving rule for making a judgment of positive time change dV/dt in volume of the input output gain from the instantaneous gimbal angle information with V as the volume cost function in the input output gain. This enables to avoid the off-line planning of complicated gimbal angle, thereby easily and effectively achieving to avoid singularity. Because of these reasons, the GM is the most popular driving rule for an attitude control of space craft bodies such as artificial satellites and the like and is the basis of studies on singularity avoidance.

It is to be noted that there are two kinds of singularity; one is an "passable singularity" that is capable of avoiding or getting rid of the condition by a null motion operation, while the other is a "impassable singularity" that is unable to avoid or get rid of the condition by such null motion operation. In case of a pyramid configuration system comprising four SG-CMGs (Single Gimbal-CMGs), there is a "impassable singularity" and the GM method is impossible to ensure its operation at the "impassable singularity". Although it is possible to get rid of the "passable singularity" by the null motion operation, the output torque becomes zero in this case.

Consequently, various theoretical studies have been made in order to cope with the "impassable singularity". For example, proposed are an SR-inverse method as disclosed in Nakamura, Y. and Hanafusa H., "Inverse Kinematic Solutions with Singularity Robustness for Robot Manipulator Control", Journal of Dynamic Systems, Measurement and Control, Vol. 108, September, (1986), pp. 163-171 (Non-patent Document 2), a generalized SR-inverse method as disclosed in Bong Wie, David Bailey and Christopher Heiberg, "Singularity Robust Steering Logic for Redundant Single-Gimbal Control Moment Gyros", AIAA Journal of Guidance, Control and Dynamics, Vol. 24, No. 5, (2001) pp. 865-872 (Non-patent Document 3) and the like. All of such prior art are methods for avoiding or getting rid of the singularity by causing small torque disturbance at or near the "impassable singularity". However, there is a need for performance tradeoff due to torque disturbance.

On the other hand, Kurokawa H., "Constrained Steering Law of Pyramid-Type Control Moment Gyros and Ground Test", AIAA Journal of Guidance, Control and Dynamics, Vol. 20, No. 3, (1997), pp 445-449 (Non-patent Document 4) proposes a driving rule that provides a constraint condition to achieve an operation not to reach the "impassable singularity". However, it is a countermeasure at the immediate location of the "impassable singularity" but not directed to avoid undesired situations at the areas both at and near the singularity including the "passable singularity" where the input output gain is insufficient. As a result, if this particular driving rule is employed, it is impossible to deny the existence of incapability to output sufficient torque. Moreover, when it reaches the "passable singularity", it is possible that the output torque becomes zero temporarily in a certain direction.

Accordingly, the aforementioned driving rules can be applied only to cases where the necessary torque is very small such as maintaining an attitude other than at and near the "passable singularity". However, in case of high speed attitude change that continuously requires a large feed forward torque, countermeasures near the singularity are insufficient in the input output gain for achieving torque necessary for attitude change.

It is useful to previously perform off-line path planning of the gimbal angle operation in order to avoid singularity and secure sufficient input output gain. However, an off-line path planning as disclosed, for example, in Paradiso J., "Application of a Directed Search to Global Steering of Single Gimballed CMGs", CSDL-P-3014, Proc. Of the AIAA Guidance, Navigation and Control Conference, New Orleans, La., August, (1991) 12-15, AIAA Paper 91-2718 (Non-patent Document 5) is very complicated and causes a calculation load problem.

SUMMARY OF THE INVENTION

In consideration of the foregoing circumstances, it is the object of the present invention to provide a real time CMG driving rule that is capable of avoiding singularity even in case of requiring a large torque such as an attitude change, securing input output gain about an axis that needs the torque and efficiently output the torque.

The attitude change control method, the attitude change control system, the attitude change control program and the program recording medium according to the present invention employ the following unique construction.

(1) An attitude change control method for controlling the attitude change of a space craft including a plurality of CMGs (control moment gyros) as actuators for controlling attitude of the space craft characterized in generating angular and angular velocity target profiles for each gimbal of the CMGs for efficiently outputting a torque in the main direction that requires a torque for changing the attitude as compared to that in the non-main direction perpendicular to the main direction in which relatively less torque is required.

(2) An attitude change control method of the above (1), wherein the target profiles of the angle and angular velocity for each gimbal of the CMGs are calculated in a short time depending upon real time data of the detected current angle and angular velocity of the space craft and the current angle and angular velocity of each gimbal of the CMGs, thereby enabling to perform in real time.

(3) An attitude change control method of the above (1), wherein a weighted input output gain is generated by providing different weighting to the input output gain in the torque main direction and in the non-main direction perpendicular thereto for outputting a larger torque in the torque main direction, and the target profiles of the angle and angular velocity for each gimbal of the CMGs are generated by applying the weighted input output gain to the gradient method (GM) for efficiently outputting the torque in the torque main direction.

(4) An attitude change control method of the above (1), wherein the plurality of CMGs comprise single gimbal CMGs for driving a flywheel by a single gimbal or double gimbal CMGs for driving a flywheel by two gimbals.

(5) An attitude change control system for controlling the attitude change of a space craft including a plurality of CMGs (control moment gyros) as actuators for controlling the attitude of the space craft, comprising means for generating target profiles of the angle and angular velocity for each gimbal of the CMGs for efficiently outputting a torque in the main direction that requires a torque for attitude change more than in the non-main direction perpendicular thereto and requiring relatively less torque.

(6) An attitude change control system of the above (5), wherein the target profile of angle and angular velocity for each gimbal of the CMG are calculated based upon the real time data of the detected current angle and angular velocity of the space craft as well as the current angle and angular velocity for each gimbal of the CMG, thereby enabling to perform in real time.

(7) An attitude change control system of the above (5), wherein the input output gains having different weightings in the torque main direction and the non-main direction perpendicular thereto are generated for enabling to output a larger torque in the torque main direction, and the weighted input output gains are applied to the gradient method for generating the target profile of the angle and angular velocity for each gimbal of the CMG, thereby efficiently outputting the torque in the torque main direction.

(8) An attitude change control system of the above (5), wherein the plurality of CMGs comprise either single gimbal CMGs for driving a fly wheel by a single gimbal or double gimbal CMGs for driving a flywheel by two gimbals.

(9) An attitude change control system of the above (5), further comprising feed forward control means for calculating the control torque to output the necessary torque in a feed forward manner and feedback control means for calculating an error component of the control torque by the feed forward control means for outputting a correction control torque.

(10) An attitude change control system of the above (5), wherein the space craft is a satellite.

(11) An attitude change control program for enabling a computer to execute the attitude change control method of the above (1).

(12) A program recording medium for recording the attitude change control program of the above (11) in a computer readable recording medium.

The attitude change control method employing the algorithm known as the "anisotropic weighted gradient method (AWGM)", the attitude change control system, the attitude change control program and the program recording medium according to the present invention have the following practical advantages.

Firstly, the amplification ration of the input output gain in the main torque output direction can be increased as compared to that of the most popular conventional gradient method. Secondly, it is possible to set the amount of amplification of the input output gain quantitatively and to any desired value.

As a result, in attitude control of space crafts such as satellites or the like, it is possible to avoid singularity not only in case of maintaining the attitude but also in case of changing the attitude when a large torque is necessary, thereby securing a sufficient input output gain about the axis that requires such torque and efficiently outputting such torque. It achieves the CMG driving rule that operates in real time.

DETAILED DESCRIPTION OF EXEMPLARY EMBODIMENTS

Now, exemplary embodiments of the attitude change control method, the attitude change control system, the attitude change control program and the program recording medium according to the present invention will be described in detail with reference to the accompanying drawings. It is to be noted that the attitude change control method and the attitude change control system will be described in detail in the following descriptions on the exemplary embodiments. However, the attitude change control program for enabling a computer to execute in accordance with the attitude change control method or the way of realizing the attitude change control program as a program recording medium in a computer readable manner are believed to be easily understood, therefore descriptions on such embodiments are abbreviated herein.

(Features of the Present Invention)

Before describing exemplary embodiments of the present invention, descriptions will be made on principal features of the present invention. Principal features of the present invention include efficiently outputting a large torque of a control moment gyro (referred to as CMG below) for attitude change control as an attitude change control actuator that is installed in a space craft such as a satellite or the like, thereby achieving a driving rule for driving each gimbal in the CMG system in such a manner to operate in a real time. It is to be noted herein that the CMG shall mean an actuator capable of rotary controlling the attitude of a satellite and outputting a large torque by a gyro effect in which a flywheel rotating at a constant speed is rotated by a gimbal that has a rotary axis in the perpendicular direction relative to the rotary shaft of the fly wheel.

As will be described in detail hereunder, the gimbal driving method according to the present invention (referred to as an anisotropic weighted gradient method (AWGM) below) provides the most effective use of CMG system resources as compared to various conventional driving rules for driving the gimbal of CMG in such applications as quickly changing the attitude of a space craft such as a satellite that requires to continuously output a large torque because it is able to efficiently output a large torque about the axis.

Moreover, the amount of amplification of the torque output efficiency in the present invention can be quantitatively set to any desired value as an amplification ratio relative to the case of the conventional "gradient method (GM)" that is the most popular driving rule. Consequently, by estimating the output torque, it is possible to quantitatively acquire the target torque to be amplified at the planning stage of the attitude change profile.

In conventionally proposed driving rules, there are many methods of calculating gimbal operations for achieving the necessary torque in advance in an off-line manner because of difficulty of handling the CMG system. However, they are all complicate in software logic, time consuming in the off-line calculations and necessitating a high speed computer, thereby encountering a calculation load problem. On the other hand, in the algorithm of the "anisotropic weighted gradient method (AWGM)" according to the present invention, it is possible to avoid such calculation load because of eliminating the need for in-advance planning and employment of a real time driving rule that is achievable in simple operations.

In addition, the attitude change control system of the present invention can be applied not only to space crafts such as satellites but also to a driving rule for efficient attitude change control in a robot manipulator system.

(Target System to which the Invention is Applied)

Figure 1:
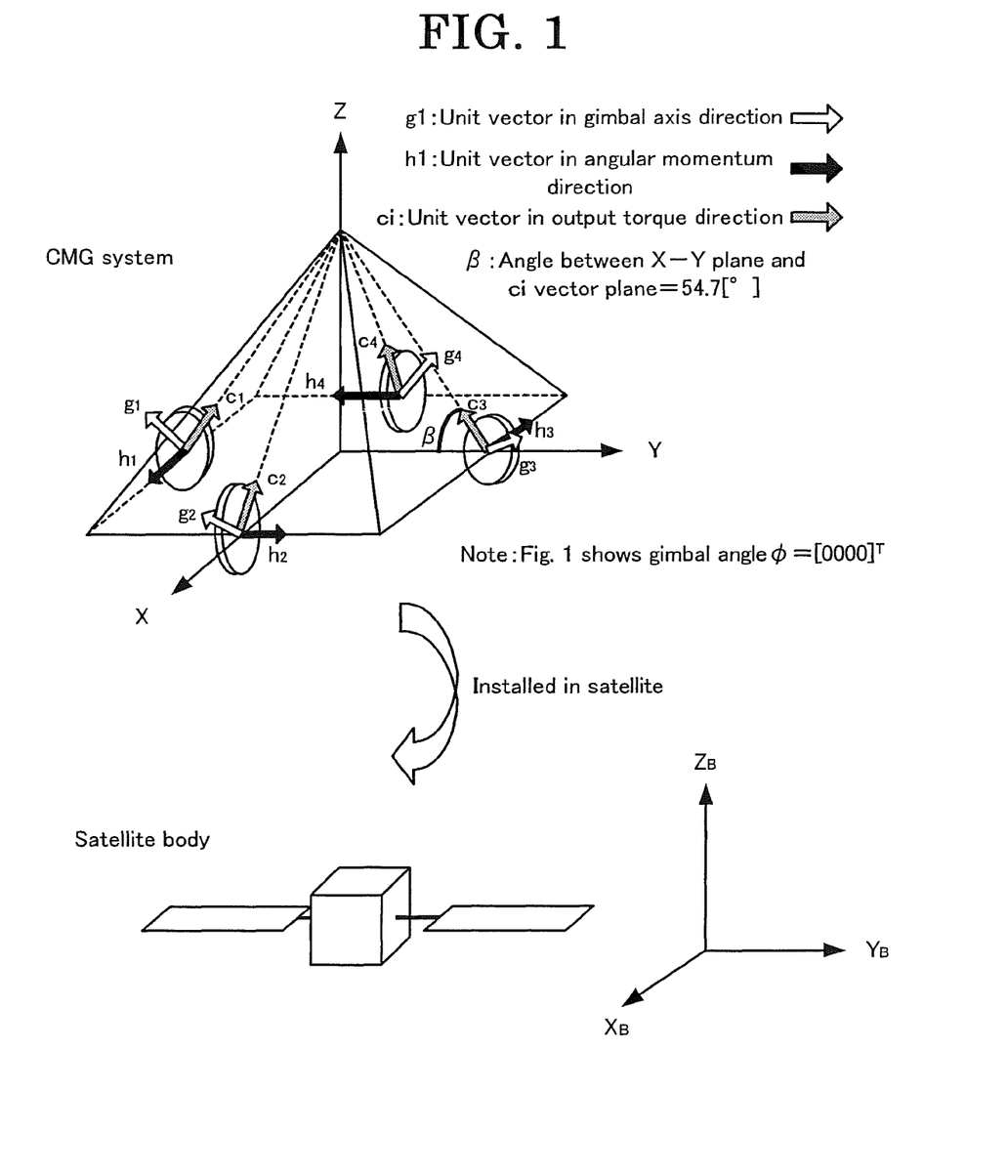
FIG. 1 is an illustration for describing an example of the CMG system in an artificial satellite to which the attitude change control system according to the present invention is applied.

Now, a description will be made on an exemplary attitude change control of a satellite. In the particular example of the satellite to which the present invention is applied, four single gimbal CMGs (referred to as SG-CMGs below) each driving the flywheel by a single gimbal are installed in the satellite as a pyramid configuration CMG system. FIG. 1 illustrates an example of such CMG system in the satellite to which the attitude change control system according to the present invention is applied.

The CMG system as shown in FIG. 1 is one of the most common system in which the pyramid configuration CMG system is configured using four SG-CMGS, thereby enabling to provide a desired torque in the three axial directions. Since it has one degree of freedom redundancy as a gimbal operation to achieve the necessary torque, a null motion operation to provide zero output torque is possible even if a gimbal angle is operated.

As shown in FIG. 1, the pyramid configuration CMG system comprises four SG-CMGs disposed in such a manner that the four planes perpendicular to their unit vectors gi (i=1~4) have the angle β=54.7 degrees with respect to the base plane of the pyramid. With such particular configuration, they operate in such a manner that unit vectors hi in the direction of angular momentum and unit vectors ci in the direction of output torque rotate within the planes perpendicular to the unit vectors gi in the gimbal axis, thereby achieving torque outputs in the direction of output torque ci in response to the angular velocity at the gimbal angle, thereby enabling to control the attitude change of the satellite. Generally, such redundancy in the CMG system is used for avoiding the singularity that will be described hereinafter.

On the other hand, a reaction wheel (referred to as RW below) is an actuator that generates a counter-force torque as a result of rotation of the flywheel, thereby rotating the attitude of the satellite. The RW provides a smaller output torque as compared to the CMG. However, there is no difficulty in the driving rule because of absence of any singularity.

As described hereinabove, the CMG system outputs a torque in proportion to the angular velocity of the gimbal angle. Accordingly, it can be said that the CMG driving rule is an algorithm for making a decision how to drive the gimbal angle of each CMG in order to obtain the necessary torque. Difficulties in the CMG driving rule include "non-linear time varying system" and the "singularity" inherent to the CMG system.

In case of finding a proper input for the necessary output torque, it is possible to geometrically calculate the input in the RW system because it is a linear and time constant system. By applying such input, the necessary torque can be obtained as long as the necessary torque is within the maximum output range of the hardware.

However, in case of a CMG system, it is anon-linear, time varying system in the output torque relative to the gimbal angular velocity that is the input to the system. Since the input depends upon the driving path of the gimbal angle φ, it is impossible to geometrically calculate the output torque based upon the installed configuration unlike the RW system. Although the CMG provides the output torque basically in proportion to the input gimbal angular velocity dφ/dt, it has an inherent characteristic to provide an insufficient output torque about a certain axis near singularity even if a large gimbal angular velocity dφ/dt is inputted. Moreover, on the singularity, the output torque about a certain axis is zero even for infinite gimbal angular velocity dφ/dt.

The ratio of the output torque T relative to the input gimbal angular velocity dφ/dt can be expressed by the input-output gain G using its norm as follows:

$$G=\|T\|/\|d\phi/dt\|$$

Figure 2:
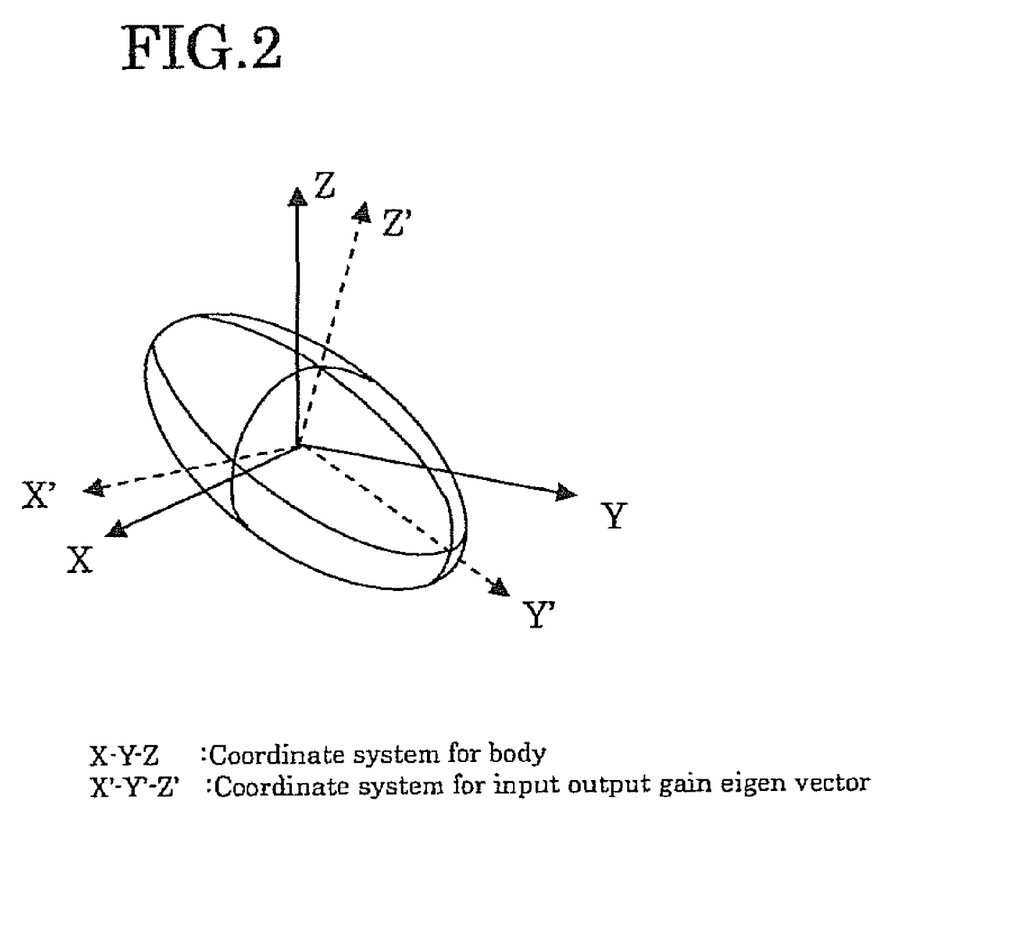
FIG. 2 shows a shape of the input output gain in the CMG system.

FIG. 2 shows how the input output gain changes. That is, FIG. 2 is a chart to show the shape of the input output gain in the CMG system. Since there are directions that are easy and difficult to provide the output torque in the CMG system, the shape of the input output gain $\|T\|/\|d\phi/dt\|$ on the eigen vector coordinate system X', −Y', −Z' becomes elliptic as shown in FIG. 2. And the shape of the input output gain $\|T\|/\|d\phi/dt\|$ changes time to time depending upon the gimbal angle φ.

Figure 3:
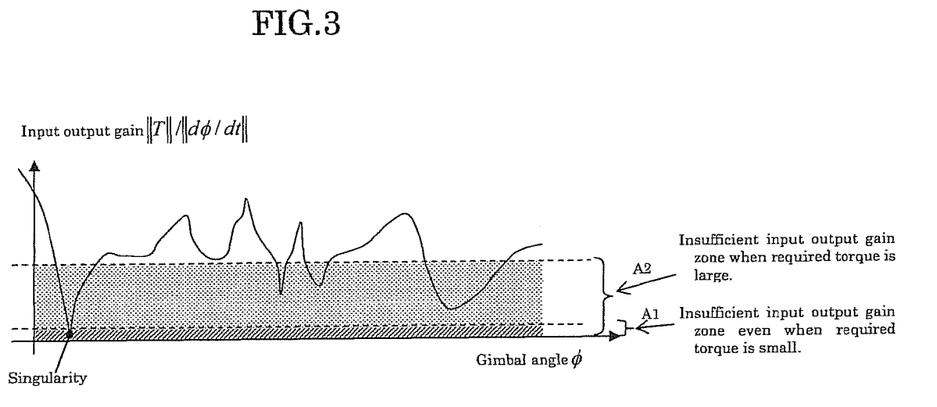
FIG. 3 is a simplified graph to illustrate how the input output gain of the necessary torque changes with respect to the gimbal angle in the CMG system.

Now, it is assumed that there is a need for a torque in a certain direction. As shown in FIG. 3, the input output gain $\|T\|/\|d\phi/dt\|$ in that direction changes not only near the singularity but also smoothly and continuously over the entire range of the gimbal angle φ. FIG. 3 is a simplified illustration to show how the input output gain for the necessary torque changes with the gimbal angle in the CMG system. If the input output gain in a certain direction approaches an insufficient region and the input gimbal angular velocity dφ/dt for achieving the necessary torque T exceeds the limit in the angular velocity of the CMG hardware, it is natural that the necessary torque can not be outputted, thereby causing a trouble in the attitude control performance.

In case of maintaining the attitude, only a small control torque is necessary and it should pay attention to only near the singularity as shown in a zone A1 (where the input output gain is insufficient when the necessary torque is small) in FIG. 3. However, in case of high speed attitude change, there are continuous needs for a large feed forward control torque. Consequently, there is an insufficient input output gain zone A2 (insufficient region in input output gain when a large torque is necessary) in FIG. 3 that is much larger zone than the zone A1 for maintaining the attitude. This means that the CMG system is sensitive to the input output gain in case when a large torque output is necessary.

Construction of the Embodiment

Figure 4:
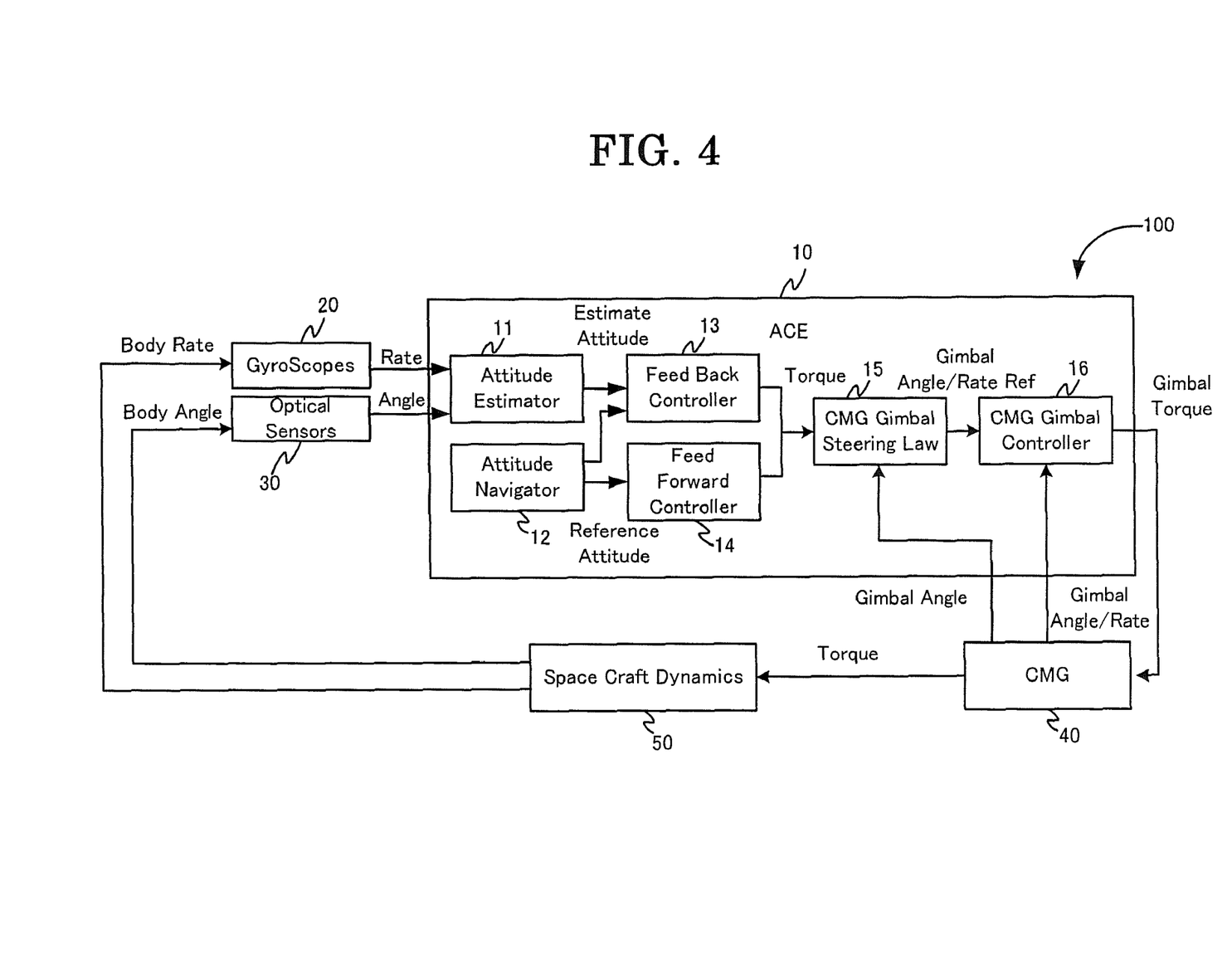
FIG. 4 is a functional block diagram to illustrate an exemplified system construction of the attitude change control system according to the present invention.

Now, shown in FIG. 4 is a functional block diagram of the satellite attitude control system to which the present invention is applied. That is, FIG. 4 is a functional block diagram to show the construction of an exemplified attitude change control system according to the present invention. As shown in FIG. 4, the attitude change control system 100 comprises gyro sensors (or gyro scopes) 20 that are attitude information sensors for detecting attitude information for space craft dynamics 50 representing attitude dynamics of the space craft (satellite) in which the attitude change control system 100 is installed, optical sensors 30, a CMG (Control Moment Gyro) 40 that is an actuator for the space craft dynamics 50 or for moving the attitude of the satellite, and an attitude control electronics (ACE) 10 for outputting instructions to the gimbal of the CMG 40 by utilizing information from the gyro scopes 20 and the optical sensors 30. It is to be noted herein that the gyro scopes 20 detect the attitude angular velocity dθ/dt of the space craft dynamics 50 or the satellite and the optical sensors 30 detect the attitude angle θ of the space craft dynamics 50 or the satellite.

It is to be noted herein that no detailed description on the internal structure of the gyro scopes 20 and the optical sensors 30 as shown in FIG. 4 will be given because they are well known to designers of satellite attitude control system and also they are not directly relating to the present invention.

Although the ACE 10 may comprise only hard wired logic circuits, it may be realized by program logics run by software (attitude control program) together with one or more control logics including a computer such as a CPU. It is also possible to record the attitude control programs in a computer readable recording medium (such as an FDD, a CD, a DVD, an SD memory, a USB memory or the like) for installation on the built-in computer.

As shown in the attitude change control system 100 in FIG. 4, the ACE 10 further comprises at least an attitude estimator 11, an attitude navigator (or an attitude profile calculator) 12, a feedback controller 13, a feed forward controller 14, a CMG gimbal steering law (or a CMG gimbal target profile generator) 15 and a CMG gimbal controller 16. As mentioned hereinabove, at least one or all of these circuit blocks may be realized by software.

The attitude estimator 11 has a function to estimate the current attitude (or estimated attitude) of the space craft dynamics 50 or the satellite based upon the outputs from the gyro scopes 20 and the optical sensors 30. On the other hand, the attitude navigator 12 has a function to calculate the reference attitude profile of the satellite.

The feed forward controller 14 calculates the control torque that is necessary for achieving the reference attitude profile within a predetermined time based upon the feed forward minimum time control technique from such information as the targeted angle and the angular velocity of the satellite. Also simultaneously calculated is the decoupling amount necessary for avoiding interference between axes that is caused by angular momentum of the satellite. The amounts that are calculated by the feed forward controller 14 are outputted as the torque in a feed forward manner.

The feed back controller 13 calculates a correction control torque for correcting attitude error components from the reference attitude that are unable to follow by the feed forward control of the feed forward controller 14 based upon the angle and angular velocity of the satellite in the reference direction as well as the current angle and angular velocity of the satellite. The torque equal to the calculated amount by the feed back controller 13 is outputted in the feed back manner.

The CMG gimbal steering law 15 is a primary circuit block constituting the present invention and is the portion for generating the driving rule as the target profile for the purpose of setting each gimbal angle and angular velocity of the CMG, thereby enabling to efficiently output the torque about the axis necessary for changing to the reference attitude. In this particular embodiment, an algorithm known as the "anisotropic weighted gradient method (AWGM)" is employed for enabling to easily and quickly generate the reference angle and angular velocity for each gimbal in a real time manner based upon the angular information that is one of the control torque from the feed forward controller 14, the correction control torque from the feed back controller 13 and the current gimbal condition.

The CMG gimbal controller 16 provides a minor loop control for enabling the gimbal to perform the reference movement based upon the gimbal angle error and gimbal angular velocity error that are calculated from the current gimbal conditions (angle and angular velocity of each gimbal) that are acquired from gimbal angle and angle sensors in the CMG 40 and the reference gimbal conditions (angle and angular velocity for each gimbal) that are inputted from the CMG gimbal steering law 15.

Operation of the Embodiment

Now, an exemplified operation of the attitude change control system 100 according to the present invention as shown in FIG. 4 will be described with reference to FIG. 5 that is a simplified illustration to show an exemplified attitude change control method of the attitude change control system 100 as shown in FIG. 4 according to the present invention. In the attitude change control method according to the present invention, when changing the attitude that needs a larger torque than maintaining the attitude as shown in FIG. 5, employed in the CMG gimbal steering law 15 is the CMG driving rule by the CMG driving rule or the "anisotropic weighted gradient method (AWGM)" that is capable of efficiently outputting a larger torque specializing about the target axis.

Now, an exemplified operation of the "anisotropic weighted gradient method (AWGM)" will be described with reference to FIG. 5. Firstly, the CMG driving rule by the AWGM is based upon the CMG driving rule according to the conventional "gradient method (GM)". It is to be noted herein that the "gradient method (GM)" is not the driving rule for avoiding only on and near singularity but the only driving rule having a nature for qualitatively maintaining the input output gain always high. It is the most popular driving rule.

In the CMG driving rule according to the conventional "gradient method (GM)", the input output gain volume as represented by the ellipse that has been described hereinabove with reference to FIG. 2 is chosen as the cost function and the gimbal in the CMG is driven in such a manner to increase the input output gain volume. To increase the input output gain volume means to have an effect of converting an ellipse into a sphere. As a result, the CMG driving rule according to the conventional "gradient method (GM)" is an "isotropic" driving rule for driving the gimbal so that the input output gain is maintained equal in all directions. In other words, the conventional "gradient method (GM)" is for making the input output gain volume (average gain) into a sphere as the cost function in order to achieve the effect of increasing the cost function, thereby providing an isotropic effect of departing from the singularity in all axial directions.

However, when changing attitude, unlike in case of maintaining attitude, a large output torque is necessary in a certain direction but no large torque is required in directions perpendicular to that direction. This means that a sufficient input output gain should be secured only in the direction where a large torque is required and the input output gain in directions perpendicular to the required direction can be small. Accordingly, when changing attitude, the conventional "gradient method (GM)" results in securing a large input output gain in unnecessary directions, thereby departing from the efficient and optimum driving rule for changing the attitude.

It is therefore useful for obtaining an efficient driving rule when changing the attitude to distort the ellipse of the input output gain in the direction that requires a large torque and to perform the "isotropic" driving to secure the input output gain dominating in the torque outputting direction when changing the attitude, thereby securing a large input output gain only in the direction where a large torque is required for changing the attitude.

Figure 5A:
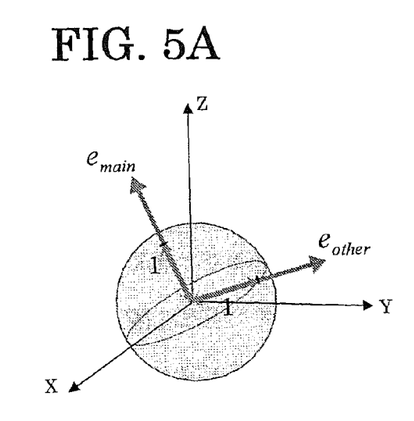
FIG. 5 is simplified illustrations for describing the operation of the attitude change control system as shown in FIG. 4.

The effect of increasing the input output gain volume by choosing the cost function by the conventional "gradient method (GM)" is to increase the volume in all directions and thus converting it into a sphere as shown in FIG. 5(A). Then, the effect of the isotropic input output gain amplification is normalized to "1". That is, effects of amplification of the unit vector $e_{main}$ the maneuver main torque $(T_{main})$ direction and the unit vector $e_{other}$ in the perpendicular direction to the maneuver main torque $(T_{other})$ are set to "1". Then, in order to use the effect of the "gradient method (GM)" for the purpose of increasing the input output gain in the main torque direction that is necessary when changing the attitude, chosen is a new cost function of anisotropic weighted input output gain to have a virtually smaller weighting in the main torque direction than in the perpendicular direction to the main torque direction as shown in FIG. 5(B).

Figure 5B:
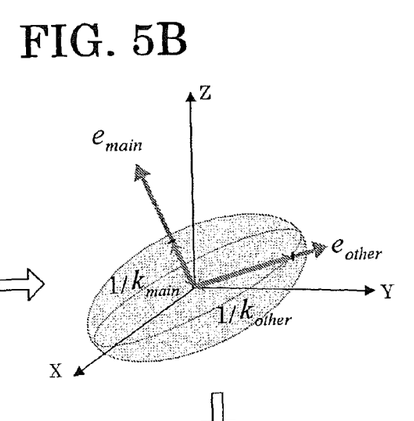

In other words, an input output gain weighting $k_{main}$ in the $e_{main}$ direction and an input output gain $k_{other}$ in the $e_{other}$ direction are used as weighting parameters as shown in FIG. 5(B). Then, the weighting is made by multiplying $(1/k_{main})$ in the $e_{main}$ direction and multiplying $(1/k_{other})$ in the $e_{other}$ direction. By the use of such weighting, generated is a virtual input output gain of virtually ellipse volume as the cost function having a smaller weighting in the $e_{main}$ direction than in the $e_{other}$ direction.

Then, the "Gradient Method (GM)" is applied to the virtually ellipse volume of the new cost function, i.e., the anisotropic weighted virtual input output gain having a smaller virtual weighting in the $e_{main}$ direction than in the $e_{other}$ direction.

Figure 5C:
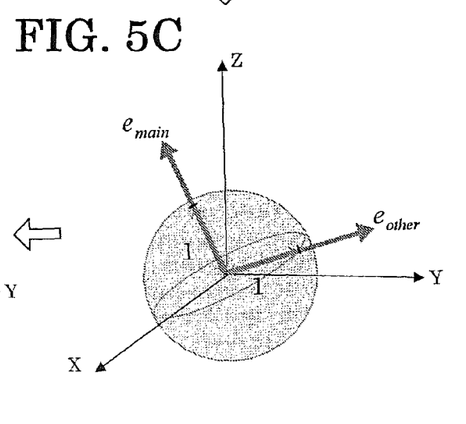

As described hereinabove, the "gradient method (GM)" has the effect of amplifying an ellipse volume equally in all directions and converting it into a spherical volume. Accordingly, if the virtual ellipse volume as shown in FIG. 5(B) is chosen as the new cost function for applying the "gradient method (GM)", there is an effect of converting the volume of the cost function into a sphere as shown in FIG. 5(C).

Figure 5D:
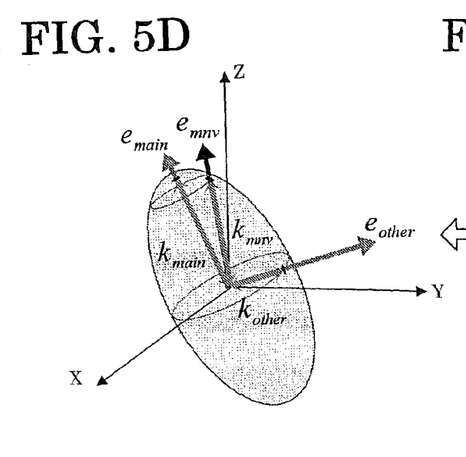

As a result, if seen the actual input output gain, the "gradient method (GM)" tends to amplify by $(1/k_{main})$ times in the direction with smaller weighting by the weighting parameter $(1/k_{main})$, there by securing a larger gain as shown in FIG. 5(D). In other words, in the main torque direction $e_{main}$ to have a smaller virtual cost function than in the perpendicular direction to the main torque direction $e_{other}$ by multiplying $(1/k_{main})$ as the weighting, it is further increased by amplifying to $(k_{main})$ times, thereby achieving the result of making an ellipse volume having the longer diameter in the required direction.

Consequently, assuming that the required torque direction in actual maneuver is in an $e_{mnv}$ direction consisting of a component in the main torque direction and a component in the direction perpendicular thereto as shown in FIG. 5(D), one can expect only the component $k_{mnv}$ in the $e_{mnv}$ direction in the shown ellipse volume as the amplification ratio of the input output gain.

It is to be noted here that, as for the shape of the anisotropic weighted ellipse volume, various parameters such as the input output gain weighting $k_{main}$ in the maneuver main torque direction, the input output gain weighting $k_{other}$ in the perpendicular direction $T_{other}$ to the maneuver main torque and the like are designed in consideration of distribution of the necessary torque as shown in FIG. 5(D). In other words, firstly, the torque for changing the attitude is decomposed into a component in the main torque direction and a component in non-main direction that is perpendicular to the main torque direction. The ratio of these components is used for designing the ratio of the longer radius and the shorter radius of the ellipse volume, i.e., the shape of the ellipse volume. Moreover, as for the size of the ellipse volume, parameters are designed in consideration of the amplification ratio of the input output gain.

If the longer radius and the shorter radius of the ellipse volume are set, for example, 1.5 and 0.8, it means that the input output gain is set to 1.5 times for the main torque direction and 0.8 times for the direction perpendicular to the main torque direction.

Advantages of the Embodiment

As apparent from the above description, the present embodiment exhibits the following advantages: Firstly, it is possible to provide a larger amplification factor of the input output gain in the main torque output direction as compared to the most popular conventional "gradient method (GM)". Secondly, it is possible to set the amplification of the input output gain quantitatively and to any desired value.

Figure 6:
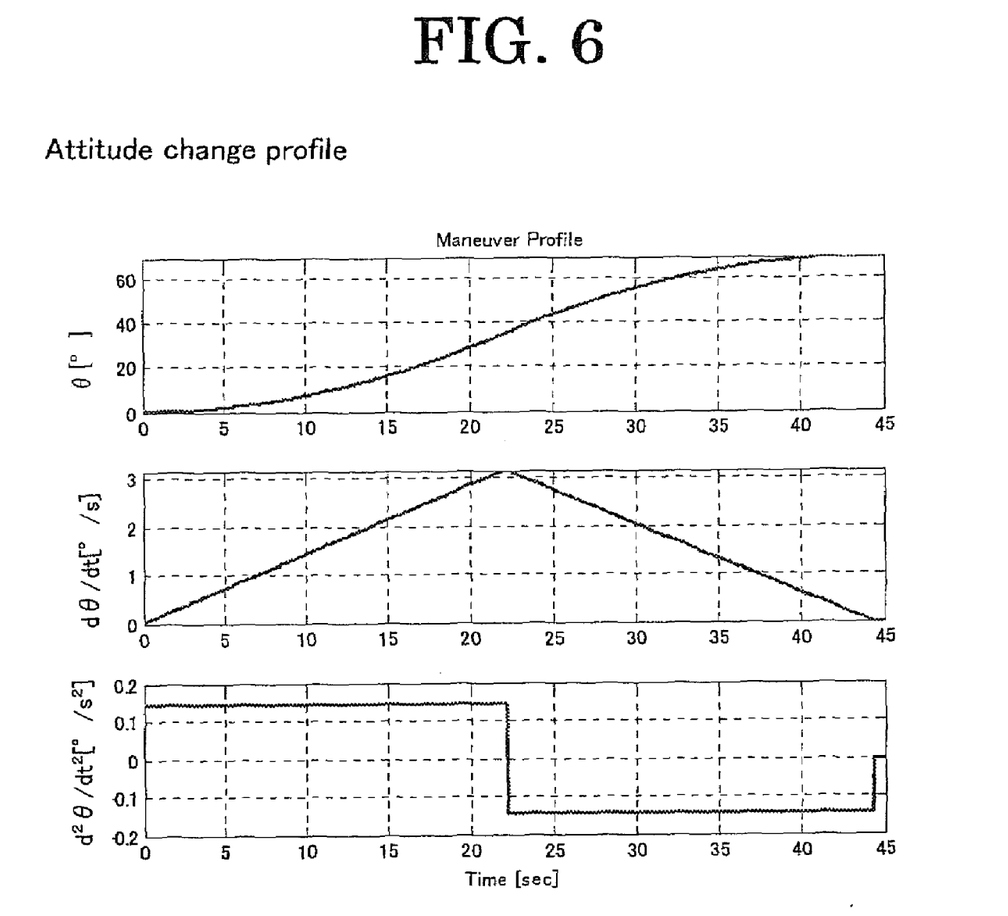
FIG. 6 is an example of maneuver profile of angle, angular velocity and angular acceleration about the attitude change axis.

These advantages may be confirmed by comparing the "anisotropic weighted gradient method (AWGM)" according to the embodiment of the present invention and the conventional "gradient method (GM)" under the same gimbal angle condition. Now, a result of simulation analysis for confirming the advantages of the "anisotropic weighted gradient method (AWGM)" according to the present embodiment will be described hereunder. In this simulation, four SG-CMGs of the pyramid configuration are used to configure the attitude change control system. In the particular example, 70 degrees attitude change is carried out about an axis of 45 degrees azimuth angle and 45 degrees elevation angle with respect to the horizontal axis in the body coordinate system. FIG. 6 is a simplified chart of an exemplified maneuver profile of the angle$\theta$, the angular velocity $d\theta/dt$ and the angular acceleration $d^2\theta/dt^2$ about the attitude change axis, thereby showing profile in this simulation. In other words, this simulation assumes that the satellite to be controlled is a rigid body to be controlled to change its profile attitude about a predetermined axis as shown in FIG. 6. More specifically, the angle$\theta$ about the attitude change axis varies with time t, i.e., gradually increases from 0 degree to reach 70 degrees in the target direction for changing the attitude after 45 seconds. In this case, as apparent from the angular acceleration $d^2\theta/dt^2$, it is controlled so that the angular velocity $d\theta/dt$ increases linearly up to 22.5 seconds and there after decelerates linearly until 45 seconds.

Figure 7:
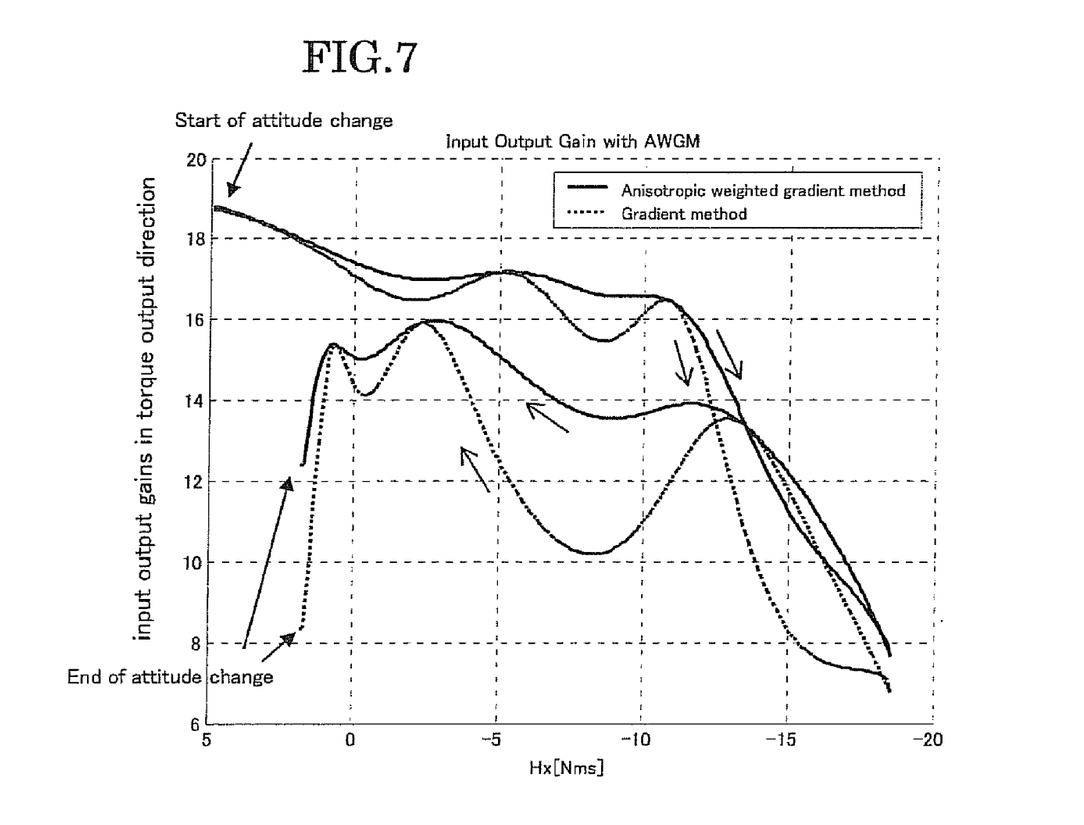
FIG. 7 is exemplary simulation results to show changes of input output gain in the torque outputting direction in case of using the "anisotropic weighted gradient method (AWGM)" according to the exemplary embodiment of the present invention as well as a conventional gradient method (GM) under the same gimbal angles conditions.

FIG. 7 is graphs for describing the simulation results of the attitude change in FIG. 6 and showing how the input output gain changes in the torque output direction in case of the attitude change by applying the "anisotropic weighted gradient method (AWGM)" and also how the input output gain changes in the torque output direction in case of applying the conventional "gradient method (GM)" under the same gimbal angle condition. The horizontal axis represents the "angular momentum Hx (Nms) about the X axis as a result of the attitude change", while the vertical axis represents the "change of the input output gain in the torque output direction". It is to be noted herein that the anisotropic weighting in this simulation is 2.0 as the weighting in the main torque direction $k_{main}$, while 0.5 as the weighting in the direction perpendicular to the main torque direction $k_{other}$.

Although they take various gimbal angle configurations from the start to the end of the attitude change, FIG. 7 verifies that the case of applying the "anisotropic weighted gradient method (AWGM)" enables to provide a larger input output gain in the torque output direction as compared to the case of applying the conventional "gradient method (GM)".

Figure 8:
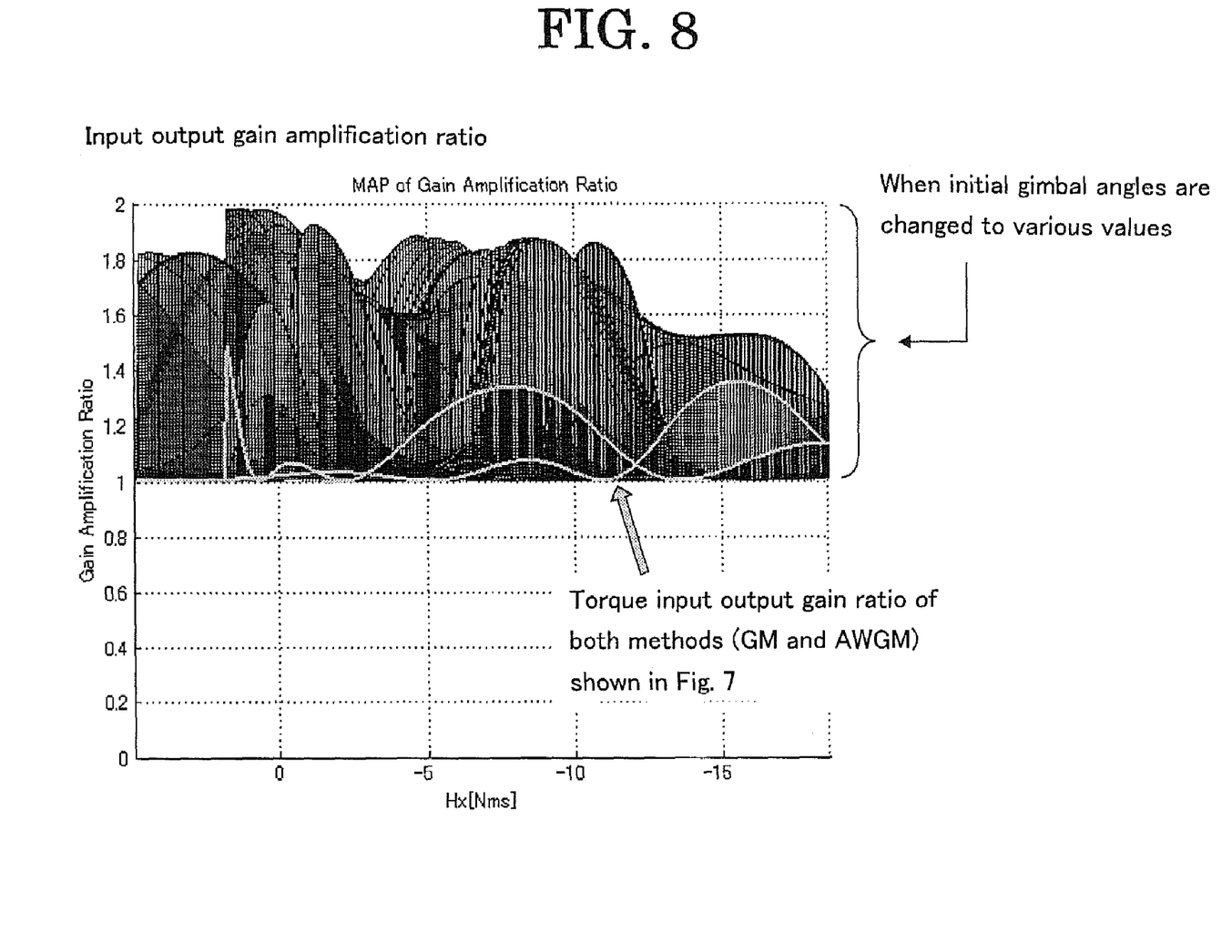
FIG. 8 is the ratio of the input output gain in the torque output direction in case of using the "anisotropic weighted gradient method (AWGM)" and the input output gain in the torque output direction in case of using the conventional gradient method (GM) as shown in FIG. 7. Also shown in FIG. 8 is the amplification ratio in the input output gain when the initial configuration in the gimbal angle is varied.

FIG. 8 shows the input output gain amplification ratio in the torque output direction in case of applying the "anisotropic weighted gradient method (AWGM)" with respect to that in case of applying the conventional "gradient method (GM)" as shown in FIG. 7.

Also shown in FIG. 8 is the input output gain amplification ratio in case of changing the initial configuration of the gimbal angle. The result shows that the amplification ratio reaches 2 times at maxim, thereby enabling to confirm the quantitative effect of the designed weighting parameter $k_{main}=2.0$ in the main torque direction. It is to be noted from FIG. 8 that the "anisotropic weighted gradient method (AWGM)" does not always realize a certain larger amplification ratio over the conventional "gradient method (GM)". That is, in a certain direction that has achieved the maximum input output gain by applying the conventional "gradient method (GM)", it is natural that the "anisotropic weighted gradient method (AWGM)" according to the present embodiment is unable to achieve even larger amplification.

In this particular embodiment, a description is made on an example in which the attitude profile while changing the attitude has been determined as shown in FIG. 6. As a result, it is confirmed that the input output gain is amplified to effectively output torque in the main torque output direction by the "anisotropic weighted gradient method (AWGM)". In other words, a confirmation is made that the predetermined attitude profile or the predetermined torque profile can be achieved with a smaller gimbal angular velocity input with small energy. In case where the attitude changing profile is not predetermined, it is of course possible that the use of the "anisotropic weighted gradient method (AWGM)" helps to output a larger torque, thereby shortening the time necessary for changing the attitude.

Other Embodiments of the Present Invention

The "anisotropic weighted gradient method (AWGM)" that has been described on one embodiment hereinabove in detail may be applied not only to the single gimbal CMG (SG-CMG) but also to a double gimbal CMG (DS-CMG) in which a flywheel is driven by two gimbals. As for the CMG configuration, it is to be noted that the application of the present invention is not restricted to the pyramid configuration unlike the case in the aforementioned embodiment.

Incidentally, movement equations in a robot manipulation system include a singularity similar to the aforementioned CMG system in a space craft such as a satellite. It is also possible to define an operational ellipse volume for such singularity. Accordingly, the present invention can be applied to not only attitude change control for a space craft such as a satellite but also to a robot manipulation system for efficient driving rule.

Although some exemplary embodiments of the present invention have been described hereinabove, it should be noted that such embodiments are nothing but simple examples of the present invention rather than for the purpose of restricting the present invention. It is apparent that various modifications and alternations can be made by a person having an ordinary skill in the art depending upon particular applications without departing from the scope and spirit of the present invention.

What is claimed is:

1. An attitude change control method for controlling the attitude change of a space craft including a plurality of CMGs (control moment gyros) as actuators for controlling attitude of the space craft comprising:

generating a weighted input output gain by providing different weighting to an input output gain in a torque main direction and in a torque non-main direction;

applying the weighted input output gain by providing to a gradient method (GM), and generating target profiles of the angle and angular velocity for each gimbal of the CMGs by changing torque components in the for the torque main direction and in the torque non-main direction so that the torque component in the torque main direction is larger than the torque component in the torque non-main direction, wherein the torque main direction requires a larger torque to change the attitude of the space craft than the torque non-main direction does, and wherein the torque main direction is perpendicular to the torque non-main direction.

2. An attitude change control method of claim 1, wherein the target profiles of the angle and angular velocity for each gimbal of the CMGs are calculated depending upon real time data of the detected current angle and angular velocity of the space craft and the current angle and angular velocity of each gimbal of the CMGs, thereby enabling to perform in real time.

3. An attitude change control method of claim 1, wherein the plurality of CMGs comprises one of single gimbal CMGs and double gimbal CMGs, the single gimbal CMGs each driving a flywheel by a single gimbal, the double gimbal CMGs each driving a flywheel by two gimbals.

4. An attitude change control system for controlling the attitude change of a space craft including a plurality of CMGs (control moment gyros) as actuators for controlling the attitude of the space craft, comprising:

a target profile generate unit that generates a weighted input output gain by providing different weighting to an input output gain in a torque main direction and in a torque non-main direction, that applies the weighted input output gain to a gradient method (GM), and that generates target profiles of the angle and angular velocity for each gimbal of the CMGs by changing torque components in the torque main direction and in the torque non-main direction so that the torque component in the torque main direction is larger than the torque component in the torque non-main direction, wherein the torque main direction requires a larger torque to change the attitude of the space craft than in the torque non-main direction, and wherein the torque non-main direction is perpendicular to the torque main direction.

5. An attitude change control system of claim 4, wherein the target profile of angle and angular velocity for each gimbal of the CMG are calculated based upon the real time data of the detected current angle and angular velocity of the space craft as well as the current angle and angular velocity for each gimbal of the CMG, thereby enabling to perform in real time.

6. An attitude change control system of claim 4, wherein the plurality of CMGs comprises one of single gimbal CMGs and double gimbal CMGs, the single gimbal CMGs each driving a flywheel by a single gimbal, the double gimbal CMGs each driving a flywheel by two gimbals.

7. An attitude change control system of claim 4, further comprising a feed forward control unit for calculating the control torque to output the necessary torque in a feed forward manner and a feed back control unit for calculating an error component of the control torque by the feed forward control unit for outputting a correction control torque.

8. An attitude change control system of claim 4, wherein the space craft is a satellite.

9. An attitude change control program for enabling a computer to execute an attitude change control method, the method comprising:

generating a weighted input output gain by providing different weighting to an input output gain in a torque main direction and in a torque non-main direction;

applying the weighted input output gain to a gradient method (GM), and generating tar profiles of the angle and angular velocity for each gimbal of the CMGs by changing torque components in the torque main direction and in the torque non-main direction so that the torque component in the torque main direction is larger than the torque component in the torque non-main direction, wherein the torque main direction requires a larger torque to change the attitude of the space craft than the torque non-main direction does, and wherein the torque main direction is perpendicular to the torque non-main direction.

10. A program recording medium for recording the attitude change control program in a computer readable recording medium, the program for enabling a computer to execute the attitude change control method, the method comprising:

generating a weighted input output gain by providing different weighting to an input output gain in a torque main direction and in a torque non-main direction;

applying the weighted input output gain to a gradient method (GM), and generating target profiles of the angle and angular velocity for each gimbal of the CMGs by changing torque components in the torque main direction and in the torque non-main direction so that the torque component in the torque main direction is larger than the torque component in the torque non-main direction, wherein the torque main direction requires a larger torque to change the attitude of the space craft than the torque non-main direction does, and wherein the torque main direction is perpendicular to the torque non-main direction.

* * * * *